United States Patent [19]

Kimura

[11] Patent Number: 5,197,719

[45] Date of Patent: Mar. 30, 1993

[54] REFERENCE JIG FOR USE IN MOUNTING LENS COMPONENTS IN POSITIONS, AND LENS MOUNTING METHOD USING SUCH JIG

[75] Inventor: Syuzo Kimura, Omiya, Japan

[73] Assignee: Fuji Photo Optical Co., Ltd., Omiya, Japan

[21] Appl. No.: 779,258

[22] Filed: Oct. 18, 1991

[30] Foreign Application Priority Data

Oct. 20, 1990 [JP] Japan ................. 2-280569

[51] Int. Cl.$^5$ ............................................. B25B 1/20
[52] U.S. Cl. ............................................. 269/40
[58] Field of Search .......... 269/41, 43, 40, 909, 269/910; 29/281.1, 281.5, 281.6

[56] References Cited

U.S. PATENT DOCUMENTS

| 2,743,693 | 5/1956 | Schaper | 269/40 |
| 2,911,022 | 11/1959 | Brown | 269/40 |
| 2,969,819 | 1/1961 | Bravo | 269/41 |
| 3,662,985 | 5/1972 | Parker | 269/40 |
| 4,723,768 | 2/1988 | Waller | 269/41 |
| 4,790,786 | 12/1988 | Stauss | 269/40 |

Primary Examiner—Robert C. Watson
Attorney, Agent, or Firm—Oblon, Spivak, McClelland, Maier & Neustadt

[57] ABSTRACT

A reference jig for positioning and fixing a lens or lenses in a predetermined position on a lens support structure, the reference jig including for positioning and fixedly bonding a plural number of lens components on a lens mounting surface of the support structure: a plate-like main body having a predetermined thickness and detachably fixable on the lens mounting surface of the support structure; registration members provided contiguously to the main body and engageable with reference walls of the lens support structure to hold the main body in registered position relative to the lens support structure; and notched positioning wall portions each formed in the main body and abuttingly engageable with at least two transversely opposite corner portions of a lens component to hold same in a predetermined position on the lens support structure.

3 Claims, 4 Drawing Sheets

REFERENCE JIG FOR USE IN MOUNTING LENS COMPONENTS IN POSITIONS, AND LENS MOUNTING METHOD USING SUCH JIG

FIELD OF THE INVENTION

1. Field of the Art

This invention relates to a reference jig particularly suitable for use in mounting and fixing a plural number of lens components of an optical system in predetermined positions on a lens support structure in the fabrications of a beam scanner, a photostatic copier or the like, and a method of fixedly mounting lenses exactly in position on a lens support structure by the use of such a reference jig.

2. Description of the Prior Art

For instance, the optical systems, which are used on laser beam scanners for scanning a laser beam transversely along a scanning surface at a predetermined speed, usually employ truncate lenses which need to be fixed in predetermined positions on a lens support structure. In mounting the lens components of this sort on a lens support structure, the positioning of the lenses requires extremely high accuracy. Especially in a case where a plural number of lens components are to be mounted, each one of the lens components has to be positioned on a lens mounting surface of a support structure with strict accuracy free of inclinations in vertical and horizontal directions and exactly in predetermined positional relationship with other lens components to maintain an air spacing of a predetermined width therebetween.

Therefore, as an expedient for positioning and fixing each lens component exactly in position on a lens mounting surface, it has been the conventional practice to resort to the so-called positioning projections which are provided in predetermined positions on a lens mounting surface in such a manner as to hold each lens component in position. After mounting the lens component in abutting engagement with the positioning projections, they are fixed in position by caulking the respective positioning projections.

These positioning projections are relatively small in size because they have to be provided in receded positions away from the effective surface of the lens, namely, away from an area to be scanned by a laser beam. Therefore, it is extremely difficult to position the respective lens components by means of such projections. Particularly, the projections, to be caulked after positioning the lens components, are required to have a relatively small wall thickness despite a serious problem in that they are susceptible to deformation and might cause deviations of the lens mounting position when a lens component is pressed thereagainst for positioning purposes. There may also arise a problem in that the caulking operation for fixation of lens components might cause undesirable inclinations of the lens components.

Another expedient which has been resorted to in the art is to provide stepped walls on a lens mounting surface by a prior machining operation, using stepped wall surfaces as reference surfaces in positioning the lens components. In this case, the lens components can be mounted in position simply by pressing them against the surfaces of stepped reference walls, and can be fixed in position by the use of an adhesive. However, the necessity for cutting out the reference walls on the lens support structure by a prior machining operation, coupled with the difficulty of forming high reference walls, makes the lens positioning and fixing job difficult and complicates the machining process of the lens support structures.

In short, the prior art lens positioning and fixation means which relies on lens positioning mechanisms provided on a lens, support structure itself requires a complicated machining operation for the lens support structure, failing to provide an optimum construction from the standpoint of the lens positioning job.

SUMMARY OF THE INVENTION

The present invention contemplates solving the drawbacks or problems of the prior art as mentioned above, and has as its object the provision of a lens positioning means which permits positioning of a lens or a number of lenses on a lens mounting surface of a support structure with extremely high accuracy and in a facilitated manner.

It is another object of the present invention to provide a lens positioning and fixation means which permits mounting of a lens or lenses accurately on a lens support structure without providing any lens positioning or fixing mechanism on the part of the lens support structure.

In accordance with the present invention, there is provided, for achieving the above-stated objectives, a reference jig for positioning and fixing a lens or lenses in a predetermined position on a lens support structure, the reference jig comprising for positioning and fixedly bonding a plural number of lens components on a lens mounting surface of the support structure: a plate-like main body having a predetermined thickness and detachably fixable on the lens mounting surface of the support structure; registration members provided contiguously to the main body and engageable with reference walls of the lens support structure to hold the main body in registered position relative to the lens support structure; and notched positioning wall portions each formed in the main body and abuttingly engageable with at least two transversely opposite corner portions of a lens component to hold the same in a predetermined position on the lens support structure.

In accordance with the present invention, there is also provided a method of positioning and fixing a plural number of lens components on a lens mounting surface of a support structure by the use of a reference jig having a plate-like main body of a predetermined thickness detachably fixable on the lens mounting surface of the support structure, registration members provided contiguously to the main body and engageable with reference walls of the lens support structure to hold the main body in registered position relative to the lens support structure, and notched positioning wall portions formed in the main body and abuttingly engageable with at least two transversely opposite corner portions of each lens component to hold the same in a predetermined position on the lens support structure, the method comprising: abuttingly engaging the registration members with the reference wall surfaces of the lens support structure to hold the main body in registered position thereon; applying an adhesive at least to lens mounting positions on the lens support structure or to the lens component; mounting and fixedly bonding the lens components in the respective predetermined positions on the lens mounting surface with the corner portions of each lens component in abutting engagement with the positioning walls of the main body of the reference jig; and removing the reference jig from the lens support structure after fixation of the lens component.

BRIEF DESCRIPTION OF THE DRAWINGS

The above and other objects, features and advantages of the invention will become apparent from the following description and the appended claims, taken in conjunction with the accompanying drawings which are given for illustrative purposes only and should not be construed as limitative of the invention.

In the accompanying drawings.

DESCRIPTION OF THE PREFERRED EMBODIMENTS

Hereafter, the invention is described more particularly by way of preferred embodiments of the invention with reference to the accompanying drawings.

In the following embodiments, the invention is applied to an operation for mounting a couple of truncate lenses on a lens support structure to be used for a scanning optical system of a laser beam scanner.

Figure 1:
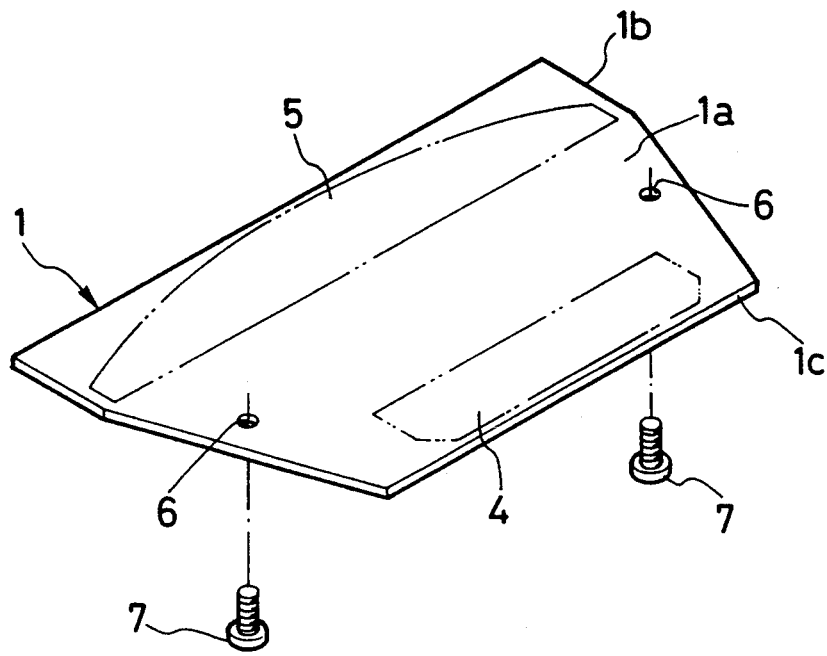
FIG. 1 is a perspective view of a lens support structure.
Figure 2:
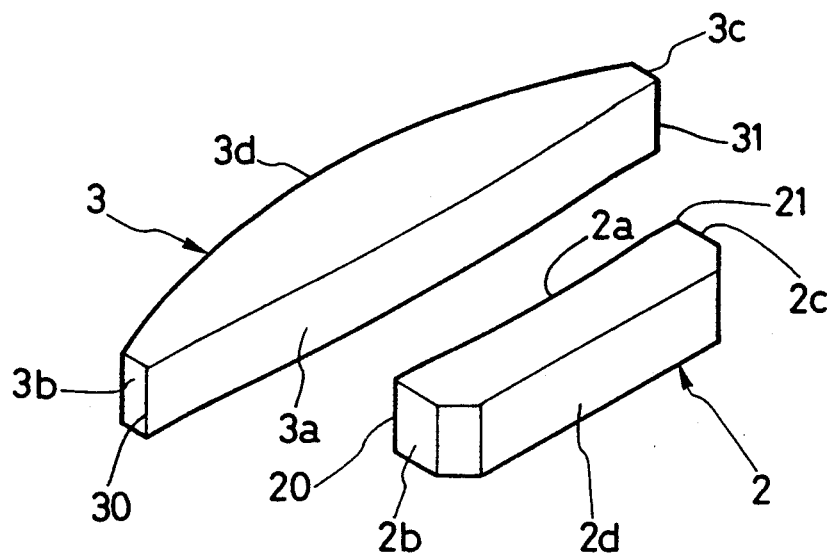
FIG. 2 is a perspective view of lens components to be mounted on the lens support structure.

Referring first to FIG. 1, indicated at 1 is a platelike lens support structure with a predetermined thickness. In order to mount a couple of truncate lens components 2 and 3 as shown in FIG. 2, the lens support structure 1 is provided with lens mounting portions 4 and 5 on a lens mounting surface 1a on the front side of the support structure 1 as indicated by imaginary lines in FIG. 1. In addition to the lens mounting surface 1a which is of course a precision-machined surface with an extremely high degree of smoothness, the support structure 1 is provided with precision-machined reference wall surfaces including a reference wall surface 1b which is provided at least at one lateral side of the support structure 1 in a direction parallel with the axes of the lens components 2 and 3, and a reference wall surface 1c which is provided at one end of the support structure 1 in a direction parallel with the lens components 2 and 3.

In the following description, those sides of the truncate lenses 2 and 3 which are to be abutted against the lens support structure are referred to as the lower or bottom side, and the opposite sides of the lens components are referred to as the upper or top side, respectively. The inner sides of the lens components 2 and 3 which face each other are referred to as inner sides 2a and 3a, and the opposite outer sides of the lens components are referred to as outer sides 2d and 3d. The lateral sides between the inner and outer sides of the lens components 2 and 3 are referred to as lateral sides 2b and 2c and lateral sides 3b and 3c, respectively. Each of the truncate lenses 2 and 3 has a flat surface at least on the bottom side thereof.

Figure 3:
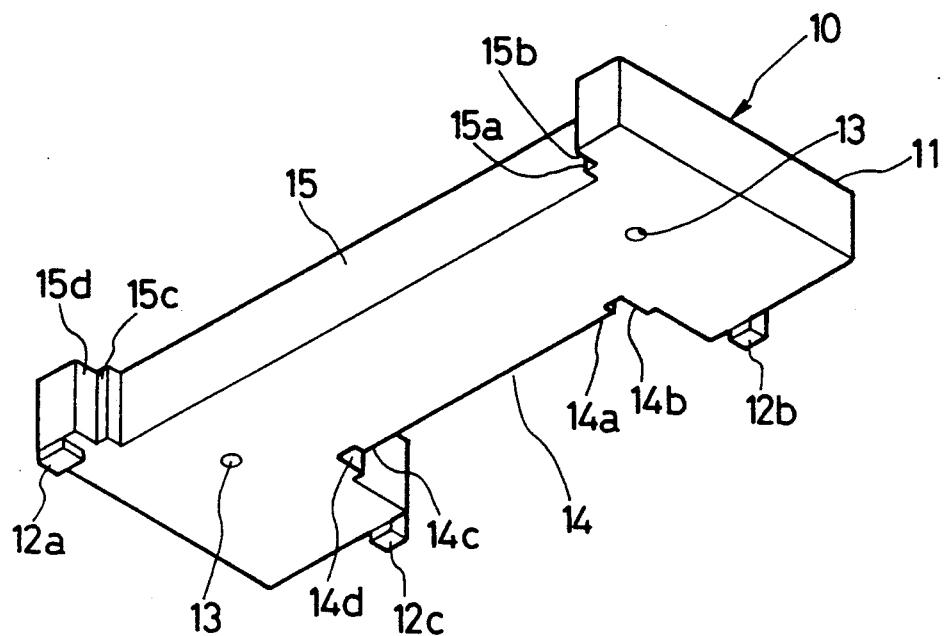
FIG. 3 is an outer view from rear side of a reference jig to be used for mounting the lens components on the support structure.

According to the invention, a reference jig 10 as shown in FIG. 3 is used for mounting the truncate lens components 2 and 3 on the lens support structure of the above-described construction. After positioning the truncate lenses 2 and 3 exactly and correctly in predetermined positions on the lens mounting surface 1a by the use of the reference jig 10, the respective lenses are fixed in position by an adhesive means.

When mounting the lenses 2 and 3 by the use of the reference jig 10, firstly it is necessary to position and fix the reference jig 10 on the lens support structure 1 correctly in an extremely stable state. Besides, after mounting the lens components 2 and 3, the reference jig 10 has to be removed. Therefore, the reference jig 10 is provided with three registering projections 12a to 12c on the lower side of its main body 11 of a predetermined thickness, namely, on the lower side of its main body 11 to be abutted on the lens mounting surface 1a of the support structure 1. The registering projection 12a is abuttingly engageable with the reference wall surface 1b, while the registering projections 12b and 12c are similarly abuttingly engageable with the reference wall surface 1c. Therefore, simply by placing the reference jig 10 on the lens support structure 1 with the registering projections 12a to 12c in abutting engagement with the reference wall surfaces 1b and 1c, the jig 10 can be easily held in a correctly registered position relative to the lens support structure 1. For fixing the reference jig 10 in the registered position on the lens support structure 1, it is advantageous to utilize mounting holes 6 which are bored in the lens support structure 1 originally for the purpose of mounting the laser beam scanner on a bracket or other support body. To this end, the reference jig 10 is provided with screw holes 13 in alignment with the mounting holes 6, and screws 7 are threaded thereinto from the lower side of the lens support structure 1 to fix them to each other.

The reference jig 10 is formed of a suitable thickness, preferably, of a thickness substantially the same as that of the truncate lens components 2 and 3, and is provided with notched portions defining a first lens positioning portion 14 for one truncate lens 2 and a second lens positioning portion 15 for the other truncate lens 3. These first and second lens positioning portions 14 and 15 are arranged to hold the truncate lenses 2 and 3 in position by abutting engagement with two transversely opposite corner portions of the corresponding lens. Namely, the corner portions 20 and 21 formed by the inner side 2a and the lateral sides 2b and 2c of the lens component 2 are abutted against positioning walls 14a and 14b and positioning walls 14c and 14d, respectively. On the other hand, the corner portions 30 and 31 formed by the inner side 3a and the lateral sides 3b and 3c of the lens component 3 are abutted against positioning walls 15a and 15b and positioning walls 15c and 15d, respectively. Therefore, the positioning walls 14a to 14d as well as the positioning walls 15a to 15d are dimensioned with strict accuracy to hold the lens components 2 and 3 correctly in position. Similarly, the line which interconnects the positioning walls 14a and 14c and the line which interconnects the positioning walls 15a and 15c are high accuracy lines to define an air spacing of a predetermined width between the lenses 2 and 3. Besides, the positioning wall surfaces are buff-finished surfaces or provided with an anti-friction coating to prevent frictional abrasion of the lens components 2 and 3 which might otherwise be caused by sliding contact with the positioning wall surfaces when positioning them on the support structure.

By the use of the reference jig 10 of the above-described construction, the lens components 2 and 3 are mounted and fixed in position on the lens support structure 1 in the manner as follows.

Firstly, the reference jig 10 is set on the lens mounting surface 1a of the support structure 1. For this purpose, the reference jig 10 is placed on the lens support structure, abutting its registering projection 12a against the reference wall surface 1b of the lens support structure 1 and then the registering projections 12b and 12c against the reference wall surface 1c. Nextly, the screws 7 are inserted into the mounting holes 6 from the lower side of the lens support structure 1, threading them into the screw holes 13 in the main body 11 of the reference jig 10 thereby firmly fastening the reference jig 10 to the lens support structure 1 in a correctly registered position relative to the latter.

In this state, an adhesive is applied on the lens mount portions 4 and 5 for fixation of the truncate lenses 2 and 3 on the lens support structure 1. The adhesive may be applied over the entire areas of the lens mount portions 4 and 5 or may be deposited at a plural number of necessary spots on the lens mount portions 4 and 5. The formation of such adhesive spots contributes to simplification of the adhesive feed process. Instead of or in addition to the lens mount portions 4 and 5, the adhesive may be applied to the lower sides of the lens components 2 and 3 to be placed in abutting engagement with the lens mount portions 4 and 5, respectively.

Figure 5:
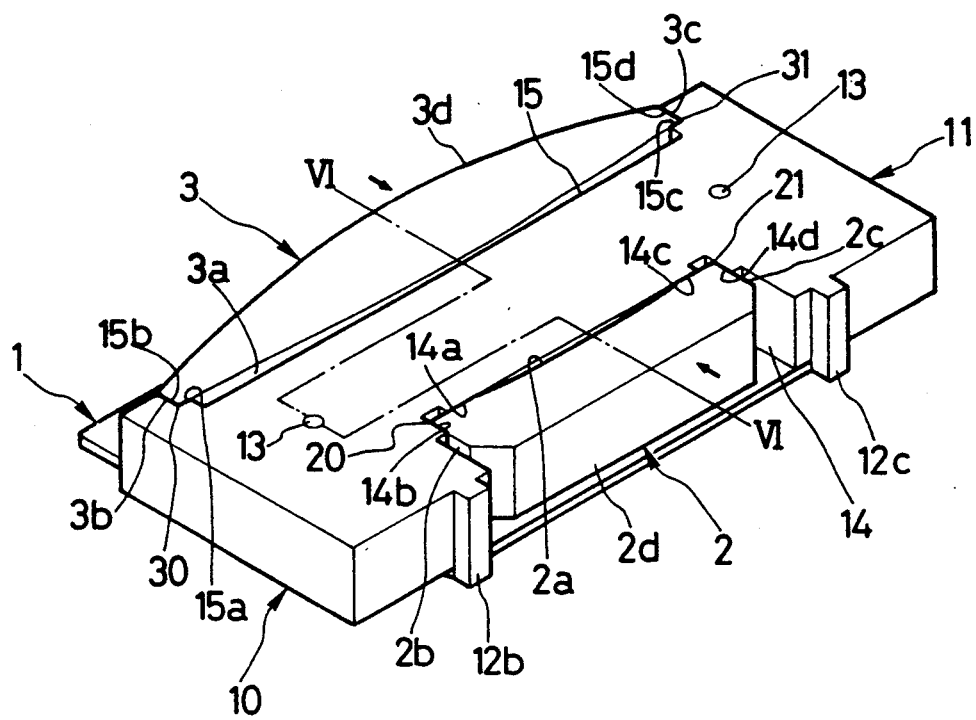
FIG. 5 is a perspective view of the lens components being mounted in predetermined positions on the lens support structure under guidance of the reference jig.

Nextly, the lens components 2 and 3 are mounted in the respective positions at the first and second notched lens positioning portions 14 and 15 of the reference jig 10. At this time, the corner portions 20 and 21 of the lens component 2 as well as the corner portions 30 and 31 of the lens component 3 are fitted in position by engagement with the positioning walls 14a to 14d of the lens positioning portion 14 or the positioning walls 15a to 15d of the lens positioning portion 15. As a result, the lens component 2 is fitted into the lens positioning portion 14 of the reference jig 10 as the inner and lateral sides 2a and 2b of the corner portion 20 of the lens component 2 and the inner and lateral sides 2a and 2c of the opposite corner portion 21 are guided in along the positioning walls 14a and 14b and the opposite positioning walls 14c and 14d, respectively. On the other hand, the lens component 3 is fitted into the lens positioning portion 15 of the reference jig 10 as the inner and lateral sides 3a and 3b of the corner portion 30 of the lens component 3 and the inner and lateral sides 3a and 3c of the opposite corner portion 31 are guided in along the positioning walls 15a and 15b and the positioning walls 15c and 15d, respectively. Consequently, the lens components 2 and 3 are positioned in the respective lens mount portions 4 and 5 as shown in FIG. 5.

Figure 6:
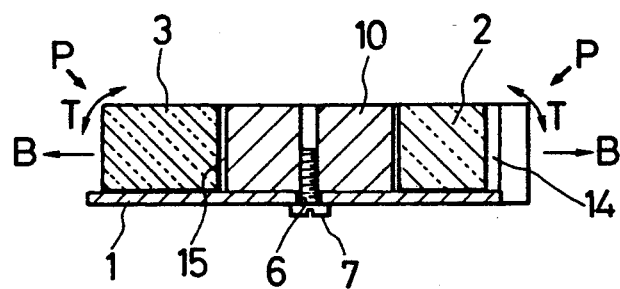
FIG. 6 is a sectional view taken on line VI-VI of FIG. 5.

In this instance, the reference jig 10 is arranged to abut against the lens components 2 and 3 only at its positioning walls which engage the inner corner portions 20 and 21 of the lens 2 and the inner corner portions 30 and 31 of the lens 30, leaving the outer sides 2d and 3d of the respective lenses open. Accordingly, the lens components 2 and 3 can be fitted into the lens positioning portions 14 and 15 in an extremely facilitated manner simply by urging the lenses into the respective positions from the open outer sides as indicated by arrows in FIG. 5. However, if simply placed in the lens positioning portions 14 and 15, the lens components 2 and 3 might be in a deviated state in the directions of arrows B in FIG. 6 or in a tilted state as indicated by arrows T in the same figure. Therefore, it is desirable to push in the lens components 2 and 3 with a finger in the direction of arrows P, preferably at an angle of about 45°, at a position in the vicinity of the ridge between the outer side 2d and the top side of the lens 2 and at a position in the vicinity of the ridge between the outer side 3d and top side of the lens 3, respectively. By so doing, the lens component 2 is correctly located in the predetermined position of the lens mount portion 4, with the lower side of the lens 2 in engagement with the lens mounting surface 1a of the lens support structure 1, the inner side 2a in engagement with the positioning walls 14a and 14c, the lateral side 2b in engagement with the positioning wall 14b, and the opposite lateral side 2c in engagement with the positioning wall 14d. Similarly, the lens component 3 is located exactly in the predetermined position on the lens mount portion 5, with the lower side of the lens in engagement with the lens mounting surface 1a of the support structure 1, the inner side 3a in engagement with the positioning walls 15a and 15c, the lateral side 3b in engagement with the positioning wall 15b, and the opposite lateral side 3c in engagement with the positioning wall 15d. Even if a relatively large force were applied to the lenses 2 and 3 when pushing them as described above, it would not cause positional deviations of the reference jig 10 since the jig 10 is fixed in an extremely stable state. Instead, the pushing force contributes to spread the adhesive applied on the lens mount portions 4 and 5, smoothing out irregular portions of the applied adhesive layer. Even in a case where the adhesive is dropped in spots on part of the lens mount portions 4 and 5, it can be uniformly spread out by the pushing force to preclude minute inclinations of the lens components 2 and 3 which might be caused by irregularities in thickness of the applied adhesive layer. The reference jig 10 which is formed substantially in the same thickness as the lenses 2 and 3 ensures stable push-in operation.

Figure 4:
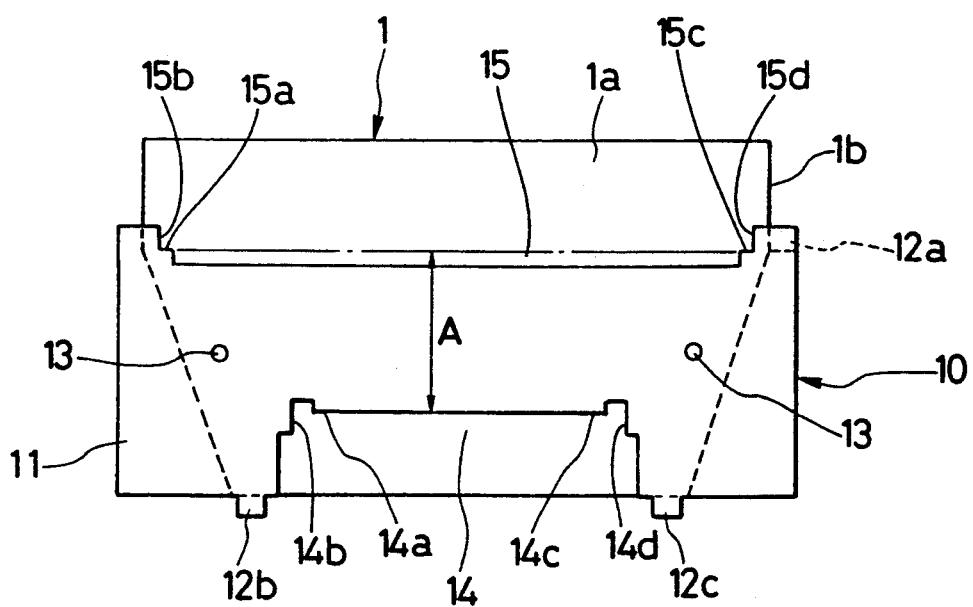
FIG. 4 is a plan view of the reference jig fixed on the lens support structure.

Consequently, the lens components 2 and 3 can be mounted correctly on the lens mount portions 4 and 4 in an extremely facilitated manner without requiring any meticulous skill, and they can be fixed in position free of inclinations in vertical and horizontal directions to maintain an air spacing of a predetermined width between the lens components 2 and 3 as indicated by arrow A in FIG. 4.

Figure 7:
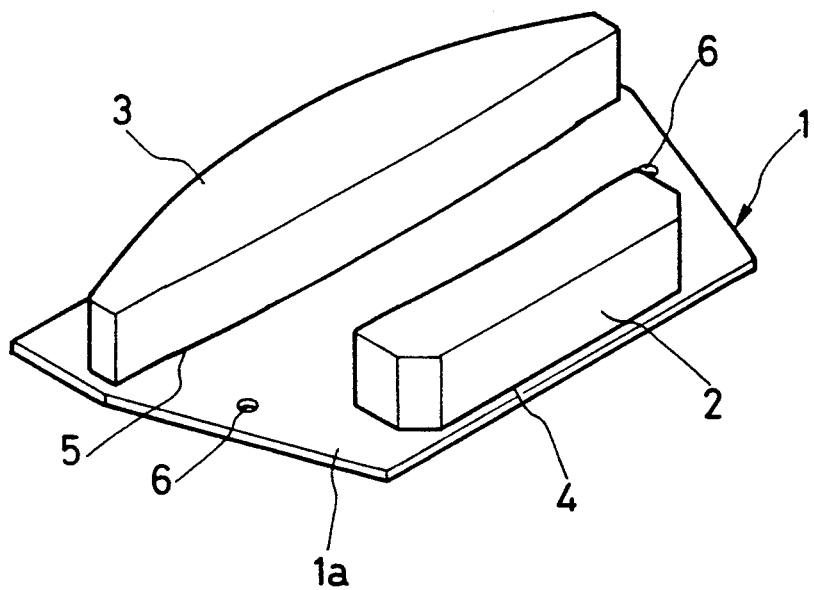
FIG. 7 is a perspective view of the lens components mounted on the lens support structure, showing the state after removal of the reference jig.

The adhesive is allowed to set after mounting the lens components 2 and 3 in the respective positions on the lens mount portions 4 and 5, and then the reference jig 10 is removed from the lens support structure 1. Upon removal of the jig 10, there is obtained an assembly which has the lens components 2 and 3 mounted and fixed exactly in predetermined positions on the lens mount portions 4 and 5 on the lens mounting surface 1a of the support structure 1 as shown particularly in FIG. 7. The removed reference jig 10 can be used again for mounting similar lens components 2 and 3 on another lens support structure 1. Thus, a single reference jig 10 can be used repeatedly for making similar lens assemblies.

Although a couple of lens components are mounted on a lens support structure in the foregoing embodiment, there is no particular restriction with regard to the number of lens components to be mounted on the support structure. In a case where the lens mounting surface contains stepped surfaces, the abutting surface of the reference jig is preferred to have complimentarily stepped surfaces. Further, the lens components to be mounted on a lens support structure are not restricted to the truncate type and may be collimator lenses or may be of other types including lenses with a flatly cut bottom surface, namely, may be of any other type as long as they have a flat surface on the bottom side to be placed on the lens mounting surface of the support structure.

What is claimed is:

1. A reference jig for positioning and fixing one or more lenses in predetermined positions on a lens support structure, said reference jig comprising, for positioning and fixedly bonding a plural number of lens components on a lens mounting surface of said support structure:

a plate-like main body having a predetermined thickness and which is detachably fixable on said lens mounting surface of said support structure;

registration members provided contiguously to said main body and engageable with reference walls of said lens support structure to hold said main body in registered position relative to said lens support structure; and notched positioning wall portions each formed in said main body and abuttingly engageable with at least two transversely opposite corner portions of a lens component to hold same in a predetermined position on said lens support structure; and fixing means for stationarily fixing said jig to said lens support structure.

2. A reference jig as defined in claim 1, wherein said support structure has mounting holes and said fixing means comprises screws which are screwed into said mounting holes.

3. A reference jig as defined in claim 1, wherein said lens components comprise truncate lenses for an optical system.

* * * * *